United States Patent [19]

Franke

[11] Patent Number: 4,785,081

[45] Date of Patent: Nov. 15, 1988

[54] PROCESS FOR THE PRODUCTION OF REACTIVE DYES BY ADIABATIC REACTION OF CYANURIC CHLORIDE WITH AN AMINO GROUP-CONTAINING DYE AT ELEVATED TEMPERATURE

[75] Inventor: Karlheinz Franke, Basel, Switzerland

[73] Assignee: Ciba-Geigy AG, Basel, Switzerland

[21] Appl. No.: 912,175

[22] Filed: Sep. 22, 1986

Related U.S. Application Data

[63] Continuation of Ser. No. 821,212, Jan. 23, 1986, abandoned, which is a continuation of Ser. No. 671,075, Nov. 13, 1984, abandoned.

[30] Foreign Application Priority Data

Nov. 10, 1983 [CH] Switzerland .......................... 6069/83

[51] Int. Cl.⁴ ...................... C09B 62/08; C09B 43/16; C09B 62/06; C09B 62/10

[52] U.S. Cl. ..................... 534/598; 534/618; 534/622; 534/631; 534/634; 534/635; 534/636; 534/637; 534/638; 540/126; 544/181; 544/187; 544/188; 544/189

[58] Field of Search ............... 534/598, 637, 638, 618, 534/622, 631, 634, 635, 636; 540/126; 544/181, 187, 188, 189

[56] References Cited

U.S. PATENT DOCUMENTS 3,950,128  4/1976  Gregory .......................... 534/598 X

*Primary Examiner*—Floyd D. Higel
*Attorney, Agent, or Firm*—Wenderoth, Lind & Ponack

[57] ABSTRACT

A new process for the production of reactive dyes by the reaction of cyanuric chloride with anionic dyes containing an amino group, which process comprises the adiabatic reaction of cyanuric chloride with the dye, at a temperature of 20° to 80° C. and a pH value of between 3.0 to 7.0, with the rapid addition of the educts within 1 to 30 minutes, produces reactive dyes in good yield and purity and is technically advantageous.

15 Claims, No Drawings

PROCESS FOR THE PRODUCTION OF REACTIVE DYES BY ADIABATIC REACTION OF CYANURIC CHLORIDE WITH AN AMINO GROUP-CONTAINING DYE AT ELEVATED TEMPERATURE

This application is a continuation of now abandoned application Ser. No. 821,212, filed Jan. 23, 1986, which is a continuation of now abandoned application Ser. No. 671,075, filed Nov. 13, 1984.

The present invention relates to a process for the production of reactive dyes by reaction of anionic dyes, which contain an amino group, with cyanuric chloride, and optionally a further reaction with ammonia or with an organic amine.

Reactions of compounds, which contain amino groups, with cyanuric chloride are customarily performed between 0° and 5° C., with cooling generally being carried out by the direct addition of ice to the reaction mixture. Higher temperatures are carefully avoided in order to prevent undesirable side reactions, for example hydrolysis of the cyanuric chloride or further reaction of the monocondensation product.

It has now been found that it is possible to react anionic dyes containing an amino group surprisingly at a temperature of 20° to 80° C. with cyanuric chloride without the mentioned side reactions unfavorably occurring. Since cooling of the reaction mixture can be dispensed with, the undesirable dilution with ice-water becomes unnecessary. By application of higher temperature, moreover, the concentration of dissolved educts and/or products is in many cases increased and the viscosity of the reaction mixture lowered, resulting additionally in an acceleration of the reaction. Furthermore, the higher temperatures render possible a considerable shortening of the reaction time, and the high concentrations promote the reaction of the cyanuric chloride with the dye containing an amino group, in relation to the hydrolysis of the cyanuric chloride.

Subject matter of the invention is a process for the production of reactive dyes by reaction of cyanuric chloride with anionic dyes containing an amino group, which process comprises the adiabatic reaction of cyanuric chloride with the dye, at a temperature of 20° to 80° C. and a pH value of between 3.0 and 7.0, with the rapid addition of the educts within 1 to 30 minutes.

It is advantageous to perform the reaction with a pH value which is not below the pK value of the dye containing an amino group.

By adiabatic reaction is meant in this case a reaction during which the reaction mixture is neither cooled nor heated, and for which there are used no reaction vessels that are particularly isolated against heat transfer.

Suitable dyes for the process according to the invention are anionic dyes which contain at least one secondary amino group or preferably one primary amino group. Especially suitable are dyes having an amino group which is deactivated to such an extent that it reacts under the process conditions with cyanuric chloride but not with the condensation product of cyanuric chloride and the dye containing the amino group.

The dyes can belong to any desired classes. They are for example: anionic, metallised or metal-free dyes of the azomethine, dioxazine, phenazine, stilbene, triphenylmethane, xanthene, thioxanthone, nitroaryl, naphthoquinone or pyrenequinone series, preferably anthraquinone, phthalocyanine or formazan dyes and in particular azo dyes.

Also optical brighteners and precursors thereof are to be understood as being dyes. Suitable for example are brighteners of the following classes of compounds: stilbenes, coumarins, benzocoumarins, pyrenes, pyrazines, pyrazolines, oxazines, mon- or dibenzoxazolyl or -imidazolyl compounds, aryltriazole and v-triazole derivatives, as well as naphthalic acid imides.

These dyes contain at least one anionic group, for example a carboxylic acid group or especially a sulfo group.

Monoazo dyes having at least one sulfo group are particularly suitable.

The process according to the invention is preferably performed at a temperature of between 40° and 60° C., and the preferred pH range is between 3.5 and 4.5.

Cyanuric chloride and the anionic dye containing an amino group are preferably used in a molar ratio of 1:0.9 to 1:1, especially in the molar ratio of 1:0.95 to 1:1.

The process according to the invention is performed for example in the following manner:

0.1 mol of anionic dye containing an amino group is dissolved in 200 to 300 ml of water, with the addition of NaOH to obtain a pH value of between 4 and 7, and heated to about 40° C. To this dye solution or suspension is then added as rapidly as possible, with vigorous stirring, 0.1 to 0.105 mol of cyanuric chloride in the form of powder, aqueous suspension or melt, and NaOH is simultaneously added so that a pH value of about 3.5 is maintained. The reaction is generally finished after 5 to 15 minutes, in the course of which the temperature has risen to 50° to 60° C.

If required, the condensation product obtained can, without isolation, be subsequently reacted with ammonia or with an organic amine. This preferred embodiment of the process according to the invention is carried out for example as follows:

The solution or suspension of the condensation product of the dye containing an amino group and cyanuric chloride, obtained according to the description given in the foregoing, is adjusted to a pH value of 7.0 by the addition of NaOH. There is subsequently added, with vigorous stirring, 1 mol of amine per mol of condensation product in the form of powder, suspension or solution, a pH value of 6 to 8, preferably 6.5 to 7.5, being maintained by the simultaneous addition of NaOH. After completion of the reaction (about 10 to 15 minutes), the temperature is at most 70° C. The resulting dye is isolated in the customary manner, for example by salting out, concentration by evaporation or preferably by spray drying.

When ammonia is used instead of an organic amine, it is advisable to maintain a pH value of between 7.5 and 10.5. Furthermore, the addition of 0.5 to 1 mol/l of ammonium chloride before the addition of ammonia is favorable for stabilisation of the pH value.

Suitable amines are for example the amines customarily used in the case of monochlorotriazinyl dyes, preferable unsubstituted or substituted anilines.

Ammonia or the amines are used for example as solids, or as an aqueous solution or suspension.

The process according to the invention is used preferably for producing reactive azo dyes; and a particularly preferred embodiment comprises producing the azo dye from diazo component and coupling component; reacting the resulting reaction mixture, without isolation of the azo dye, with cyanuric chloride, at a temperature of between 20° and 80° C. and at a pH value of between 3.0 and 7.0, for 1 to 30 minutes with the rapid controlled addition and thorough mixing of the educts; and then reacting the thus resulting condensation product of the anionic azo dye, which contains an amino group, and cyanuric chloride, without isolation, with ammonia or with an organic amine, all these reaction steps being performed adiabatically.

By the process according to the invention, the reactive dyes are obtained with a time and energy consumption lower than that required in the case of the customary processes known hitherto, and moreover with a level of yield and purity equal to or better than that obtained by the said known processes. By virtue of the elevated temperature and of operating at higher concentrations, the process according to the invention can be performed in considerably smaller reaction vessels; and with a periodic repeating of the individual steps (diazotisation, coupling, reaction with cyanuric chloride and reaction with the amine), in for example a 15 minutes' batch process for each individual step in an automated plant, there is provided in effect a quasi-continuous process. Furthermore, extremely short dosing and mixing times are realisable with the relatively small reaction volume, a factor which enables the reaction to be carried out under conditions of a practically ideal batch reactor. The control of a plant of this type is relatively simple and can be effected without difficulty by means of a microprocessor.

Instead of the quasi-continuous method of operating in a series of automated "mini-batch-reactors", it is possible to carry out either one of the aforementioned reaction steps or two or more in combination fully continuously in a flow reactor with very little back mixing but without thorough radial mixing.

there are then added 48 ml of 30% sodium hydroxide solution; the volume is subsequently made up to 380 ml with water, and 123 ml of 4N sodium nitrate solution are introduced.

The solution obtained is fed, in the course of 5 minutes, with vigorous stirring, into a solution consisting of 200 ml of water, 1 g of a dispersing agent and 140 ml of 33% hydrochloric acid. Stirring is continued for a further 5 to 10 minutes, and 5 ml of an 0.5N sulfamic acid solution are then added. The resulting suspension of the diazo compound, which has a temperature of 40° to 45° C., is introduced, within 5 minutes, into a solution of 72.5 g of 3-aminophenylurea in about 200 ml of water, the pH value of which has been adjusted to 4.5 by the addition of 30% sodium hydroxide solution, the pH value being then held at between 4.3 and 4.7 by the controlled addition, with vigorous stirring, of 30% sodium hydroxide solution. Stirring is continued for 5 to 10 minutes at this pH value, and the pH value is subsequently adjusted to 7.0 by the addition of a 30% sodium hydroxide solution.

To the solution of the azo dye, which has a temperature of 50° and a pH value of 7.0, are added all at once 88.5 g of solid ground cyanuric chloride. The pH value is allowed to fall, with vigorous stirring, to 3.0; there is then added a 30% sodium hydroxide solution until the pH value has risen to 3.5, and this pH value is maintained for 10 minutes.

There are added to the solution obtained 25 g of p-phenylenediamine and 5 g of disodium phosphate; the pH value is subsequently adjusted to 7.0 with 30% sodium hydroxide solution, and stirring is continued for 15 minutes at this value. From the solution are then isolated, by spray drying, 184 g of the dye of the formula

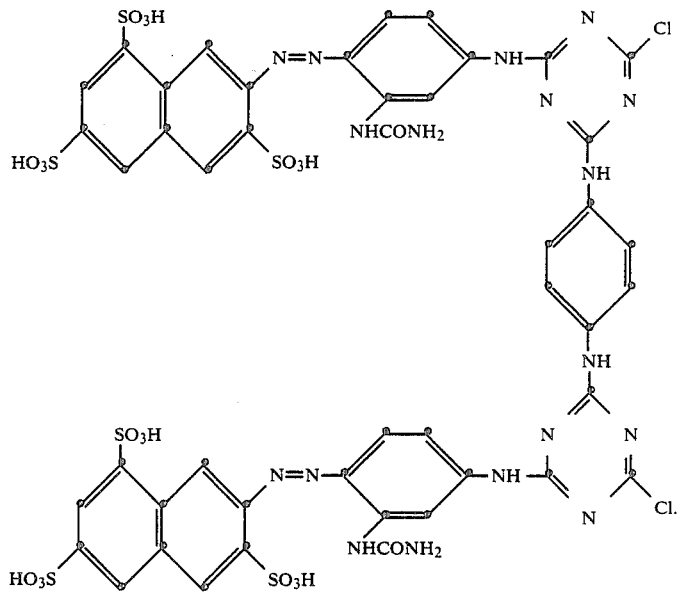

The following Examples serve to further illustrate the invention without the scope of the invention being limited by them. Percentages are percent by weight and temperatures are given in degrees Centigrade.

EXAMPLE 1

184 g of 2-naphthylamine-3,6,8-trisulfonic acid are added, with stirring, to 150 ml of water at 20° C., and The yield is 8 to 10% higher than that obtained by the synthesis of the dye in the customary manner.

With the adiabatic reaction procedure for the individual stages and without isolation of the intermediates, the total reaction time for the 4 stages, diazotisation, coupling, condensation of the azo dye with cyanuric chloride and reaction of the condensation product with the amine, is in all about 60 minutes.

The first reaction step (diazotisation) is finished after about 15 minutes, and the reaction vessel can be used again immediately for a diazotisation, so that, with an automated operation of the process, 4 reaction cycles per hour can be carried out. For the overall reaction therefore, embracing all 4 steps, there is an effective cycle time of 15 minutes.

EXAMPLE 2

If the procedure is carried out in the manner described in Example 1 except that the cyanuric chloride is used not as ground powder but as an aqueous suspension, as a solution in an organic solvent, for example acetone, or as a melt, the same dye is obtained in practically the identical quality and with the same yield.

EXAMPLE 3

There is produced, using the procedure described in Example 1, the dye of the formula

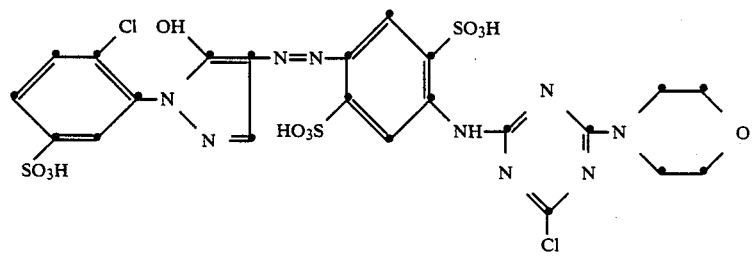

by using equivalent amounts of diazo component, coupling component, cyanuric chloride and amine, and proceeding otherwise as in Example 1.

EXAMPLE 4

There is produced, using the procedure described in Example 1, the dye of the formula

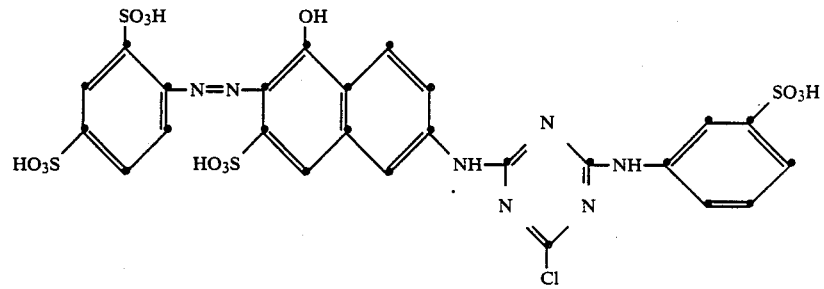

by using equivalent amounts of diazo component, coupling component, cyanuric chloride and amine, and proceeding otherwise as in Example 1.

EXAMPLE 5

There is produced, using the procedure described in Example 1, the dye of the formula

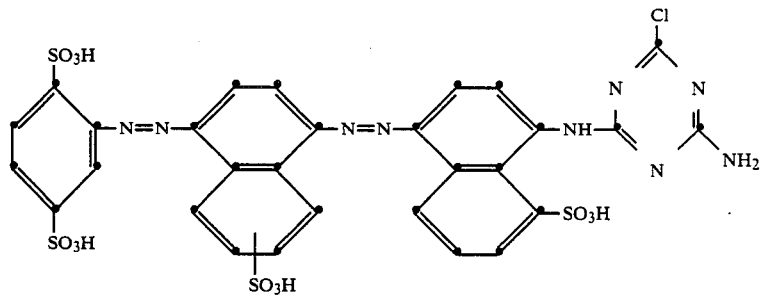

by using equivalent amounts of diazo component, coupling component and cyanuric chloride, but using, in place of the amine, ammonia with a pH value of 8.5, and proceeding otherwise as in Example 1.

EXAMPLE 6

There is produced, using the procedure described in Example 1, the dye of the formula

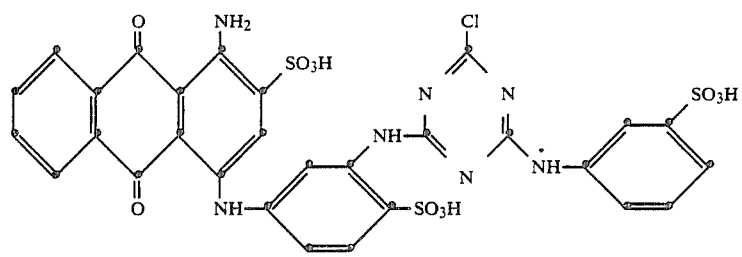

by using equivalent amounts of diazo component, coupling component, cyanuric chloride and amine, and proceeding otherwise as in Example 1.

EXAMPLE 7

There is produced, using the procedure described in Example 1, the dye of the formula

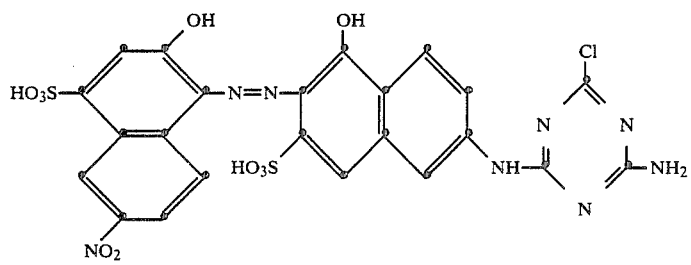

1:2-chrome or -cobalt-complex by using equivalent amounts of diazo component, coupling component and cyanuric chloride, but using, in place of the amine, ammonia at a pH value of 8.5, and proceeding otherwise as in Example 1.

EXAMPLE 8

When the procedure is carried out in the manner described in Example 1 except that there is used, instead of the azo dye firstly produced therein, the dye which has an amino group and which is contained in the following formula, with equivalent amounts of cyanuric chloride and ammonia at the pH value of 8.5, there is obtained the dye of the formula

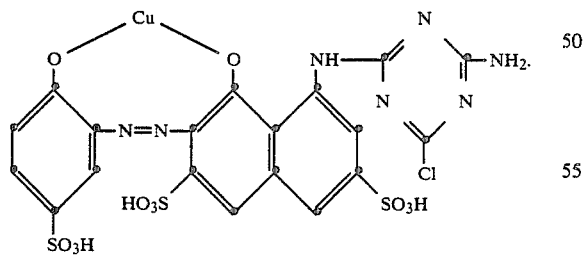

EXAMPLE 9

When the procedure is carried out in the manner described in Example 1 except that there is used, instead of the azo dye firstly obtained therein, the dye which has an amino group and which is contained in the following formula, with equivalent amounts of cyanuric chloride and ammonia at a pH value of 8.5, there is obtained the dye of the formula

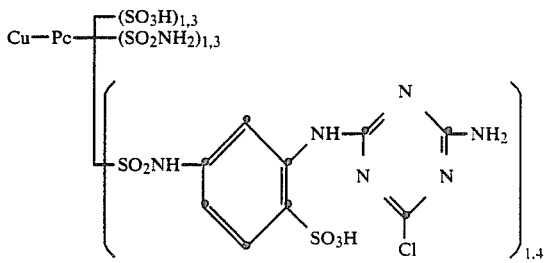

Cu—Pc = copper phthalocyanine.

EXAMPLE 10

When the procedure is carried out in the manner described in Example 1 except that there is used, instead of the azo dye firstly produced therein, the dye which has an amino group and which is contained in the following formula, with equivalent amounts of cyanuric chloride and ammonia at a pH of 8.5, there is obtained the dye of the formula

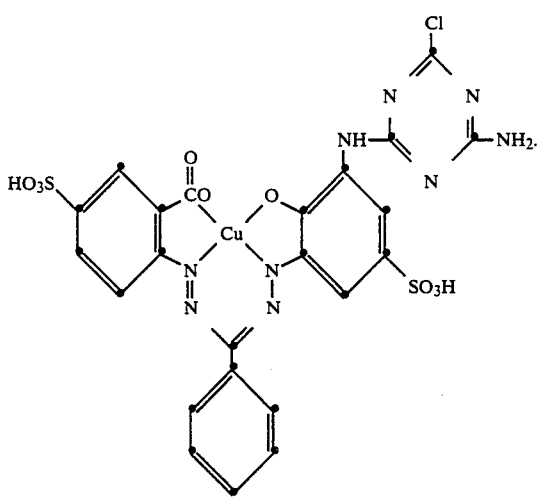

EXAMPLE 11

When the procedure is carried out in the manner described in Example 1 except that there is used, instead of the azo dye firstly produced therein, 4,4'-diaminostilbene-2,2'-disulfonic acid with equivalent amounts of cyanuric chloride and morpholine, there is obtained the following compound

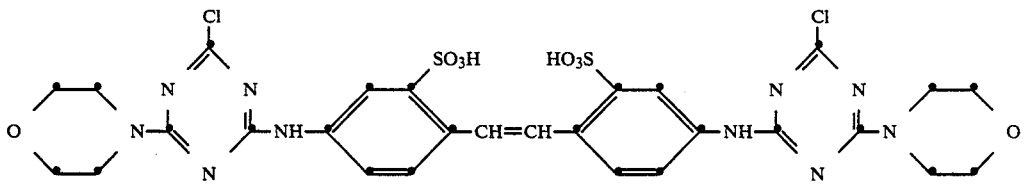

which constitutes a precursor for a valuable optical brightener.

EXAMPLE 12

One equivalent of a dye solution at a temperature of 50° C., containing 0.35 mol/l of the azo dye having an amino group, from Example 1, 0.35 mol/l of a sodium acetate buffer and 0.15 mol/l of a sodium hydroxide solution, and also 1.05 equivalents of cyanuric chloride as a melt at a temperature of 150° C. are continuously fed through a dispersing unit (for example a rotor/stator dispersing machine) on the input side into a tube reactor, and are condensed therein under adiabatic conditions.

There is attained in the dispersing unit during a retention time of 1 to 15 seconds, with a high degree of turbulence, a uniform rapid suspension of the disperse phase, the extent of reaction occurring here simultaneously being about 20 to 50%. After a subsequent further retention time of 10 to 15 minutes in a tube reactor with a good plug flow profile and thorough radial mixing, the reaction is completed to the extent of at least 98%. The condensation product then passes, at a temperature of about 60° C. and at a pH value of ~3.5, from the tube reactor and in a collecting vessel the pH value of the product is adjusted to 7.0 with a further ½ equivalent of NaOH.

The condensation product obtained is subsequently continuously or discontinuously reacted, in the manner described in Example 1, with 1 equivalent of p-phenylenediamine. There is thus obtained the dye described in Example 1 in about the same yield as in Example 1 with likewise a very high level of purity.

What is claimed is:

1. A process for the production of reactive dyes by the reaction of cyanuric chloride with anionic dyes containing an amino group, which process comprises the adiabatic reaction of cyanuric chloride with the dye, at a temperature of 40° to 60° C. and a pH value of between 3.0 and 7.0, with the rapid addition of the educts within 1 to 30 minutes.

2. The process according to claim 1, wherein the reaction is performed at a pH value of between 5 and 4.5.

3. A process according to claim 1, wherein the reaction is performed at a pH value which is not below the pK value of the dye containing an amino group.

4. A process according to claim 1, wherein the anionic dye, which contains an amino group, and cyanuric chloride are used in the molar ratio of 0.9:1 to 1:1.

5. A process according to claim 4 wherein the molar ratio is 0.95 to 1 to 1:1.

6. A process according to claim 1, wherein the condensation product of the anionic dye, which contains an amino group, and cyanuric chloride is subsequently reacted, without isolation, with ammonia or with an organic amine.

7. A process according to claim 6, wherein the reaction with ammonia is performed at a pH value of between 7.5 and 10.5; or the reaction with an amine at a pH value of between 6 and 8.

8. A process according to claim 7 wherein the reaction with the amine is performed at a pH value of between 6.5 and 7.5.

9. A process according to claim 1 wherein the employed anionic dye is an azo dye.

10. A process according to claim 9, which process comprises producing the azo dye from diazo component and coupling component; and adiabatically reacting the reaction mixture obtained, without isolation of the azo dye, with cyanuric chloride at a temperature of between 40° and 60° C. and at a pH value of between 3.0 and 7.0 for 1 to 30 minutes.

11. A process according to claim 10, wherein the resulting condensation product of the anionic dye, which contains an amino grup, and cyanuric chloride is subsequently reacted, without isolation, with ammonia or with an organic amine.

12. A process according to claim 1, wherein the employed anionic dye containing an amino group is an anthraquinone, phthalocyanine or formazan dye.

13. A process according to claim 1, which process comprises producing an anionic azo dye containing an amino group by diazotisation and coupling, reacting the resulting reaction mixture, without isolation of the azo dye, with cyanuric chloride, at a temperature of between 40° and 60° C. and at a pH value of between 3.0 and 7.0, for 1 to 30 minutes with the rapid controlled addition and thorough mixing of the educts; and then reacting the condensation product obtained, without isolation, with ammonia or with an organic amine, all the reaction steps being performed adiabatically.

14. A process according to claim 13, wherein the 4 reaction steps, diazotisation, coupling, condensation of the resulting azo dye with cyanuric chloride and reaction of the condensation product with ammonia or an amine, are combined, in an approximately 15 minutes' batch process for each individual step, in an automated plant, to provide a quasi-continuous process.

15. A process according to claim 13, wherein one or two of the reaction steps, condensation of the azo dye, which contains an amino group, with cyanuric chloride, and reaction of the condensation product with ammonia or with an amine, are carried out fully continuously in a flow reactor.

* * * * *